United States Patent [19]

Yoda

[11] 4,077,300
[45] Mar. 7, 1978

[54] PLASTIC SCREW GROMMET
[75] Inventor: Tohru Yoda, Yokohama, Japan
[73] Assignee: Nifco Inc., Tokyo, Japan
[21] Appl. No.: 673,496
[22] Filed: Apr. 5, 1976

Related U.S. Application Data

[63] Continuation of Ser. No. 504,017, Sep. 9, 1974, abandoned.

[30] Foreign Application Priority Data

Sep. 10, 1973  Japan .................................. 48-105084

[51] Int. Cl.² ............................................ F16B 13/04
[52] U.S. Cl. ..................................................... 85/80
[58] Field of Search ..................... 85/80, 81, 83, 5 R; 151/41.75

[56] References Cited

U.S. PATENT DOCUMENTS

| 2,927,497 | 3/1960 | Rapata | 85/5 R |
| 3,593,612 | 7/1971 | Schulze | 85/83 X |
| 3,701,373 | 10/1972 | Wronke et al. | 85/80 X |
| 3,756,116 | 9/1973 | Schuplin | 85/80 |

FOREIGN PATENT DOCUMENTS

| 1,139,976 | 1/1969 | United Kingdom | 85/80 |

Primary Examiner—Roy D. Frazier
Assistant Examiner—Rodney H. Bonck
Attorney, Agent, or Firm—Robert W. Beart; Jack R. Halvorsen

[57] ABSTRACT

This invention provides a plastic screw grommet which comprises in combination a flange head, a leg having a polygonal (tetragonal) section and perpendicularly extending downwardly from the underside of the said flange head, depressions formed centrally on the sides of the said leg in the surface layer thereof, rigid engaging projections are joined throughout their length and formed to rise from the bottoms of the said depressions, a screw aperture extends inwardly from the topside of the flange head along the axis of the leg and grooves extend radially from the inner wall of the said screw aperture to a point adjacent the corners of said leg.

4 Claims, 5 Drawing Figures

PLASTIC SCREW GROMMET

This is a continuation, of application Ser. No. 504,017, filed Sept. 9, 1974, and now abandoned.

BACKGROUND OF THE INVENTION

This invention relates to a screw grommet molded of a plastic material and intended for fastening as onto a metal plate another metal plate, a hook or other similar article by means of a screw. As a screw grommet of the type designed for fastening a given article with a screw onto a metal plate, it has heretofore been known to use a plastic screw grommet which comprises a flange head, a leg having a polygonal (generally tetragonal) section and perpendicularly extending downwardly from the underside of the flange head, engaging projections formed on the sides of the leg and tapering toward the extremity of the leg, a screw aperture dug inwardly from the topside of the head along the axis of the leg and grooves cut radially into the inner wall of the screw aperture.

As is universally known, this screw grommet is fastened to a given metal plate by having the leg thereof inserted into an aperture somewhat larger than the cross section of the said leg and perforated in advance through the metal plate, causing the engaging projections formed on the sides of the leg to be forcibly slid in past the edge of the said aperture by virtue of the elasticity of the material of which the grommet is made until the engaging projections are brought into snug engagement with the rear surface along the edge of this aperture and consequently immobilized against the metal plate and thereafter driving a prescribed setscrew into the screw aperture.

By virtue of this engagement of the engaging projections, therefore, the screw grommet itself gets fastened fast onto the metal plate. In order that the setscrew may be fastened with desired tightness to the screw grommet, however, this screw grommet is generally made of a rigid plastic material. If the said engaging projections are increased in their degree of protuberence, therefore, they offer unyielding resistance to the edge of the aperture in the metal plate in the process of the grommet's insertion into the aperture, defying all efforts to accomplish the insertion. For this reason, the engaging projections are inevitably formed in limited dimensions and therefore fail to provide sufficiently fast engagement. Thus, it is always found necessary that the diameter of the aperture for insertion in the metal plate and the diameter of the leg of the screw grommet are adjusted to each other to ensure safe insertion and fast engagement.

It is an object of this invention to provide a plastic screw grommet capable of providing easy engagement with the aperture perforated in the metal plate and enabling two metal plates to be fastened fast to each other.

SUMMARY OF THE INVENTION

To attain the object described above, this invention provides an improvement in and relating to a screw grommet comprising a flange head, a polygonal leg perpendicularly extending downwardly from the underside of the said flange head, engaging projections formed on the outer sides of the said leg, a screw aperture dug inwardly from the topside of the said flange head along the axis of the leg and grooves cut radially into the inner wall of the screw aperture, which improvement is characterized by forming thin-walled depressions at the portions of the outer sides of the leg selected for locating the said engaging projections and having the engaging projections connected throughout their length and formed to rise from these depressions. Since the engaging projections are initially positioned or cradled in the depressions, they have a small height and facilitate insertion of the leg into the aperture perforated in the metal plate. Further, when the setscrew is driven into the screw aperture, the depressions in the leg rise beyond their original surface and consequently the engaging projections swell out and gain in relative height, enabling the screw grommet to be fastened fast to the metal plate.

Other objects and other characteristic features of the present invention will become apparent from the description of the invention to be given in further detail herein below with reference to the accompanying drawings.

Figure 1:
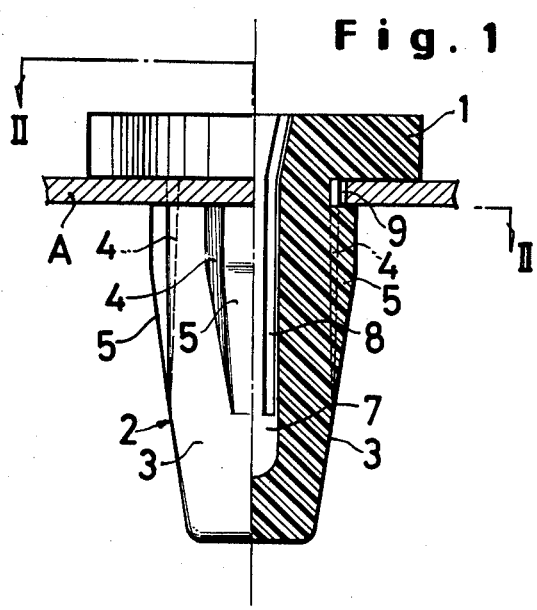
FIG. 1 is a partially sectional front view illustrating a plastic screw grommet according to this invention in a state held in engagement with a panel.
Figure 3:
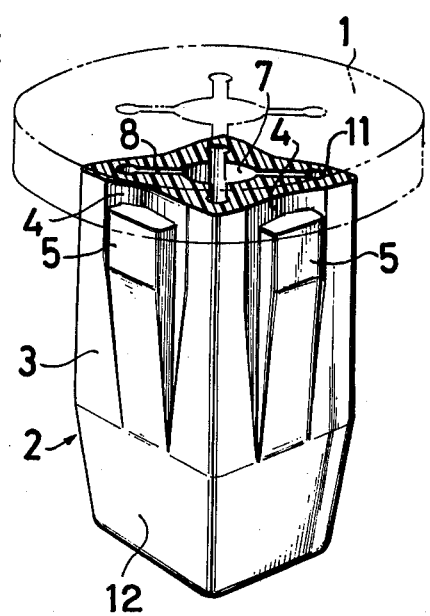
FIG. 3 is a perspective view of the screw grommet of FIG. 1, with the flange head cut away.
Figure 2:
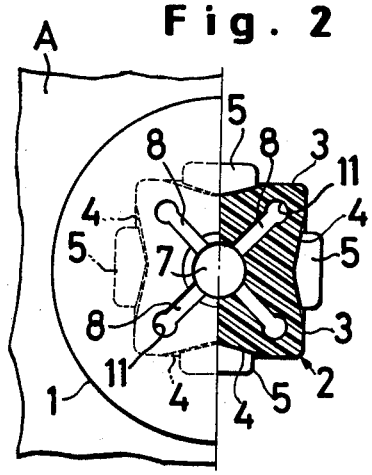
FIG. 2 is a sectional view taken along the line II—II of FIG. 1.
Figure 4:
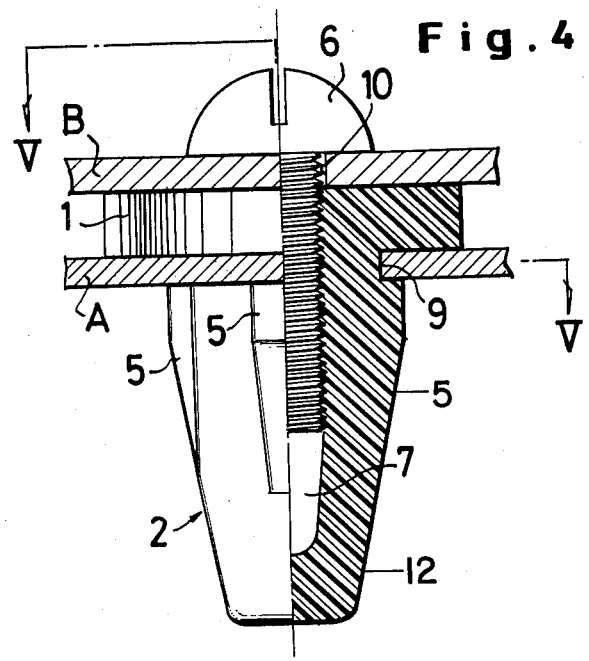
FIG. 4 is a partially sectional front view illustrating the screw grommet in a state holding two panels fastened fast against each other.

DETAILED DESCRIPTION OF THE INVENTION:

Referring to the drawings, shallow depressions 4, which are shown as being V-shaped, are formed in the surface layer at the center of the outer sides 3 of a leg having a tetragonal section and perpendicularly extending downwardly from the underside of a flange head 1 and engaging projections 5 are formed so as to be connected throughout their length and rise from the bottoms of these depressions. The ends of projections 5 adjacent head 1 terminate in shoulder means spaced from the head 1 and with at least said shoulder means projecting laterally beyond the juncture of depressions 4 with outer sides 3.

In this screw grommet, a screw aperture 7 for fastening a setscrew 6 extends inwardly from the topside of the said flange head 1 along the axis of the leg 2. In the inner wall of this screw aperture, grooves 8 are disposed radially in the directions of diagonals connecting the corners of the cross section of the leg. The grooves 8 terminate in generally axially extending cylindrical slots 11 having a diametral extent greater than the thickness of its adjacent groove 8. The slots 11 provide a stress relieving point or hinge about which the grooves 8 may open or close and the grooves 8 serve the purpose of facilitating the insertion of the fastener into aperture 9 and later the insertion of setscrew 6 into the screw aperture 7, thereby permitting the thick-walled portions, namely the projections 5 extending outside the depressions of the leg 2 to be pushed out because of the advance of the setscrew in the screw aperture and thereby causing the corresponding outer sides thereof to swell out and gain in outside diameter readily. If the aforementioned leg is formed in a hexagonal cross section, for example, these grooves will be cut radially along the diagonals of the hexagon.

To facilitate the insertion of the aforementioned leg 2 into the aperture perforated in the panel, the leg 2 is tapered off toward its extremity 12 so that the outer sides 3 thereof will be inclined, and, at the same time, the engaging projections 5 formed on these outer sides will have their surfaces equally inclined toward the extremity of the leg.

Now, in the case of the illustrated embodiment in which the aforementioned screw grommet is used for fastening to a panel A another panel B by use of a setscrew, a square aperture 9 slightly larger than the complimentary cross section of the aforementioned leg 2 is made in advance in the panel A and the leg 2 is inserted into the aperture in the panel. In this case, since the leg 2 is slightly smaller than the aperture 9, it can be easily inserted as far as the portion of the leg exclusive of the projections is concerned. Because of the engaging projections 5 formed on the outer sides of the leg, the leg is forcibly driven in past the aperture while the engaging projections are pushed down inwardly by the edge of the aperture and outer sides corresponding thereto are proportionally held back. After the engaging projections have completely passed the aperture, the projections and the corresponding outer sides return from the depressed position to their former position because of the elasticity of the material of which the screw grommet is made, with the result that the engaging projections are brought into fast engagement with the rear surface of the panel along the edge of the aperture to immobilize the screw grommet against the panel.

In order that the screw grommet may be fastened, without unwanted play, against the panel in this case, the space between the upper side of the head 1 and the upper edge of the engaging projections 5 must be fixed so as to be substantially equal to the wall thickness of the panel.

Figure 5:
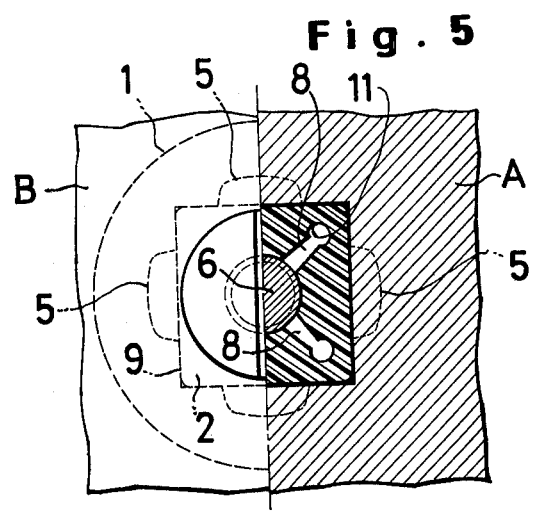
FIG. 5 is a sectional view taken along the line V—V of FIG. 4.

After the screw grommet has been fastened to the first panel, the panel B desired to be fastened is placed on the upper side of the flange head 1, the setscrew 6 is inserted downwardly through the perforation 10 formed in the panel B and then it is driven into the screw aperture 7 so that it cuts threads on the inner surface of the aperture as it advances downwardly. By virtue of the grooves 8 cut radially into the inner wall of the aperture, the advancing screw causes the thick-walled portions corresponding to the outer sides of the leg to swell out and the depressions 4 formed on the outer sides to rise outwardly, so that this outward rise of the depressions will make the engaging projections 5 extend beyond their normal surface (FIG. 5). As is clear from the foregoing explanation, the setscrew 6 has a diameter larger than that of the screw aperture in this case.

Use of a tapping screw is required so that the insertion thereof in the screw aperture will causes the screw aperture to be extended outwardly without fail.

As described above, the screw grommet according to this invention can cause two panels to be fastened one above the other. Because of the insertion of the setscrew, the leg itself expands and the engaging projections formed on the depressions are pushed out to an increased relative height, enabling the screw grommet to be fastened against the panel A with added certainty. Because of the function just described, the engaging projections can be formed in a small height relative to the outer face of the leg. Accordingly, the screw grommet can be inserted easily in consideration of the proportion of the final height of the engaging projections to the size of the aperture made in the panel for insertion. Thus, the screw grommet of this invention has an advantage of outstanding workability.

What is claimed is:

1. In a closed end one-piece plastic screw grommet comprising in combination a flange head, a polygonal leg perpendicularly extending downwardly from the underside of the said flange head, axially tapered engaging projections terminating in shoulder means on the outer sides of the said leg in spaced opposition to the underside of said head, a screw aperture extending inwardly through the topside of the said flange head and extending into and along the axis of the leg and terminating short of the free end thereof, axial grooves extending radially from the inner wall of the screw apertures towards but terminating short of each corner of said leg, the improvement which comprises forming longitudinally extending depressions in portions of the outer sides of the leg and surrounding the said engaging projections on at least the two axially disposed sides of said projections plus the portion of said leg between the shoulder means and said head, said leg having a resilient thin-walled configuration at those depressed portions of said leg, said depressions being angularly disposed inwardly relative to the axis of said leg in the direction of said head to provide the greatest flex in the outer sides of said leg adjacent said shoulder means, each said engaging projection joined throughout its length to and rising from the base of said depression and with at least the shoulder means extending laterally from said base beyond the juncture of the depression with the side of said leg.

2. A grommet of the typed claimed in claim 1 wherein said depressions have a shallow V-shape in cross-section to produce an outward buckling in the side wall of said leg when a screw is inserted in said aperture.

3. A grommet of the type claimed in claim 2 wherein each said axial groove terminates in an elongated cylindrical slot portion adjacent each corner, each said cylindrical slot portion having a diametral extent greater than the thickness of its adjacent groove to enhance bending of the side walls of said leg during insertion in a mating aperture.

4. A grommet of the type claimed in claim 1 wherein said leg includes a tapered extremity opposite the head to assist in insertion in an apertured workpiece, said axially tapered engaging projections formed on their outer sides by a surface equally inclined toward the extremity of the leg and providing a smooth continuous surface from the free end of the extremity of the leg to said shoulder means at the upper end of the projections to thereby insure a smooth insertion into said panel aperture.

* * * * *